United States Patent [19]

Sieber et al.

[11] Patent Number: 4,823,148
[45] Date of Patent: * Apr. 18, 1989

[54] PLOTTER PEN WITH ASYMMETRIC POINT

[76] Inventors: Jonathan D. Sieber; Joseph S. Sieber, both of 31 Granville Rd., Cambridge, Mass. 02138

[*] Notice: The portion of the term of this patent subsequent to Apr. 5, 2005 has been disclaimed.

[21] Appl. No.: 174,831

[22] Filed: Mar. 29, 1988

Related U.S. Application Data

[62] Division of Ser. No. 882,239, Jul. 7, 1986, Pat. No. 4,736,211.

[51] Int. Cl.⁴ .......................................... G01D 15/16
[52] U.S. Cl. ........................... 346/139 R; 346/139 C; 346/140 R; 33/18.1; 401/48; 401/195
[58] Field of Search .......... 346/140 R, 140 A, 139 C, 346/139 R; 33/1 M, 18.1, 18.2, 39.2; 401/6, 7, 48, 195

[56] References Cited

U.S. PATENT DOCUMENTS

| | | | |
|---|---|---|---|
| 2,996,044 | 8/1961 | Parker | 401/6 |
| 3,160,464 | 12/1964 | Suter | 346/139 C X |
| 3,713,171 | 1/1973 | Schepartz | 346/139 C |
| 4,288,798 | 9/1981 | Hollmayer | 346/139 R |
| 4,401,996 | 8/1983 | Shirahata | 346/139 R |
| 4,489,333 | 12/1984 | Anderka | 346/139 R |
| 4,496,958 | 1/1985 | Brandt | 346/139 R |
| 4,736,211 | 4/1988 | Sieber | 346/139 R |

Primary Examiner—Joseph W. Hartary

[57] ABSTRACT

A calligraphic writing system includes a plotter of the type having a pen carriage, a pen holder mounted on the carriage, a recording table, and means for moving the pen carriage relative to the table so that a pen mounted on the pen holder draws images on a sheet of paper or other medium mounted on the table. The pen has an asymmetric point. The pen and pen holder include positioning means arranged such that the pen may be mounted in the pen holder only in a predetermined and fixed annular position relative to the pen holder and will be maintained in that position when the images are being drawn.

4 Claims, 2 Drawing Sheets

PLOTTER PEN WITH ASYMMETRIC POINT

CROSS-REFERENCE TO RELATED APPLICATION

This application is a division of application Ser. No. 882,239 filed July 7, 1986, on which U.S. Pat. No. 4,736,211 was issued Apr. 5, 1988.

This invention relates to a pen for use in a plotter and more particularly to a plotter pen which is adapted to maintain a desired annular orientation.

BACKGROUND

In a standard x-y plotter, one or more felt tip or ball point pens, normally of different colors, are mounted in suitable holders in a pen stocker. The plotter is programmed to move a pen carriage to position a holder on the carriage to pick up a selected pen from the stocker and to move the pen carriage and either a slider on which the carriage is mounted or a paper or other medium mounted under the carriage through a predetermined path or paths to cause the pen to draw desired images on the medium. In such devices, the pen will tend to rotate slightly in the holder in use and there may be substantial rotation of the pen as a result of transfers between the stocker holder and the carriage holder. While such rotation of the pen relative to the holder is not a problem when ball point or felt tip pens are utilized, and is in fact desirable to equalize wear, it is a problem when the plotter is utilized to do calligraphy, utilizing a calligraphy-style fountain pen.

When a fountain pen is used in the plotter, point shape and ink flow vary with annular orientation of the pen; therefore, the shape, thickness and intensity of the line being drawn by the pen are dependent on the pen orientation. Therefore, to obtain desired stroke thickness and uniform (or at least controlled) stroke appearance when using a plotter t o do calligraphy with a fountain pen, it si necessary that the annular orientation of the pen in the carriage holder be the same each time a pen is picked up by the carriage holder from a stocker holder and that the annular orientation of the pen be maintained in the carriage holder while the pen is in use. In order to accomplish this objective, a desired annular orientation must be maintained for the pen in both the stocker holder and the carriage holder.

SUMMARY OF THE INVENTION

The invention, therefore, provides a calligraphic writing system including a plotter of the type having a pen carriage, a pen holder mounted on the carriage, a recording table, and means for moving the pen carriage relative to the table so that a pen mounted on the pen holder draws images on a sheet of paper or other medium mounted on the table. The pen has an asymmetric point; and the pen and pen holder include positioning means arranged such the pen can be mounted in the pen holder only in a predetermined and fixed annular position relative to the pen holder and will be maintained in that position when the images are being drawn.

In preferred embodiments, the pen is a calligraphy-style fountain pen having a casing including a radial porjection, and the pen holder includes a U-shaped element with a stop projecting from the center of connecting leg of the "U". The holder is adapted to receive the pen wedge therein between the side arms of the elements and abutting the stop, and the radial projection is adapted to fit between the stop and a side arm of the U-shaped element when the pen is mounted in the holder.

DETAILED DESCRIPTION

Figure 1:
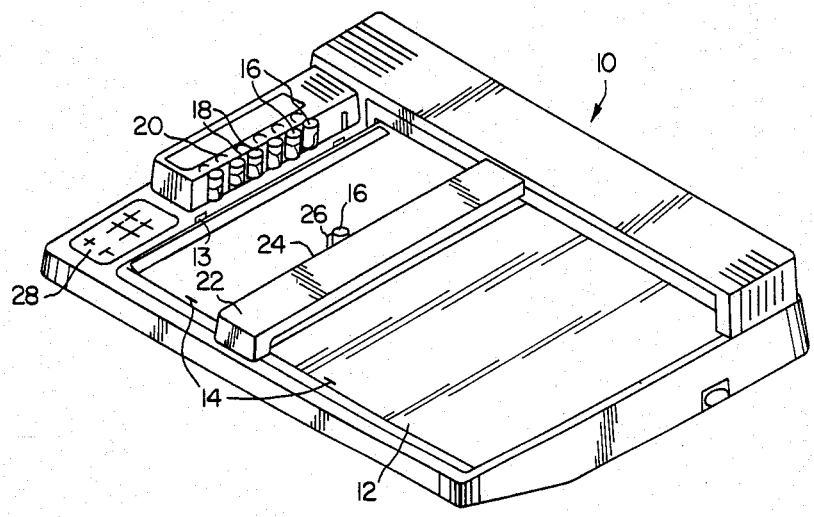
FIG. 1 is a prospective view of an x-y plotter suitable for use in practicing the teachings of this invention.

Referring to FIG. 1, a plotter suitable for use in practicing the teachings of this invention is shown. The plotter has a recording table 12 on which a sheet of paper or other medium on which images are to be plotted is positioned. Holder 13 and guides 14 are provided to position and hold the medium. A plurality of pens 16 are mounted in pen holders 18 (see FIG. 3) which form part of pen stocker 20. The pens 16 mounted in stocker 20 may be of different colors, tip thicknesses, or have other variations which result in the pen causing different impressions to appear on the paper or other recording medium when the pen is selected for use.

Horizontal movement of a pen over table 12 is caused by slider 22 moving back and forth over the table. A carriage 24 positioned in slider 22 has a pen holder 26 mounted thereon. Movement of slider 22 and carriage 24 as well as the selection of a pen 16 from stocker 20 may be programmed and controlled from operating panel 28.

In operation, carriage holder 26 is brought into proximity with a selected one of the stocker holders 18 under control of panel 28 and the selected pen 16 is picked up by carriage holder 26. The plotter then operates either under control of panel 28 or under control of a program in a standard manner to move slider 22 and carriage 24 through selected paths to cause a desired image or images to be plotted on the paper or other medium position on table 12. When plotting with a selected pen has been completed, carriage holder 26 is again positioned adjacent to the stocker holder 18 for the selected pen and the pen is transferred back to the stocker holder. The sequence of operations may then be repeated with another pen on the same medium if desired.

The plotter and the sequence of operations described to this point are conventional. An example of a plotter which operates in the manner indicated is the model NPS-P6 manufactured by Sekonic Co., Ltd, Tokyo, Japan. While a device of this type is suitable when using ball point, felt tip, or other pens with substantially symmetrical tips, such devices are not adapted to control the annular orientation of the pen in the carriage holder when a pen having an asymmetric nib or point, such as a fountain pen, is utilized. It has been found that significant rotation of the pen in the holders occurs particularly as the pens are transferred between the stocker holders and the carriage holder. This can cause unpredictable variations in line width and intensity, and therefore, unacceptable writing quality, when the plotter is used to do calligraphic writing using a calligraphic style fountain pen. This invention relates to a mechanism for overcoming this problem.

Figure 2:
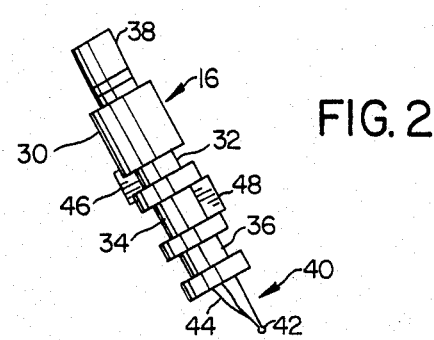
FIG. 2 is a side plan view of a calligraphy style fountain pen incorporating the teachings of this invention.

Referring to FIG. 2, a pen 16 is shown which incorporates the teachings of this invention. The pen has a hollow casing 30 with three grooves 32, 34, 36 formed therein. A threaded tube 38 projects from the top of casing 30 and is adapted to have an ink cartridge mounted thereto. A nib 40 having a point 42 and an ink reservoir 44 projects from the bottom of casing 30. A first projection 46 is formed or mounted in groove 32 in a second projection 48 is formed or mounted in groove 34. The function of projections 46 and 48 will be described shortly.

Figure 3:
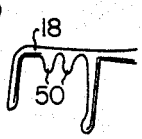
FIG. 3 is a top plan view of a stocker holder of a type suitable for use in practicing the teachings of this invention.
Figure 4:
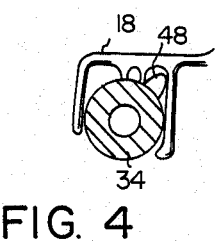
FIG. 4 is a top view, partially cut away, of the stocker holder of FIG. 3 with the pen of FIG. 2 mounted therein.
Figure 5:
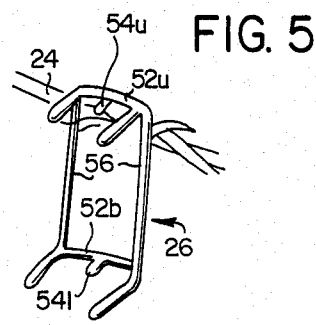
FIG. 5 is a prospective view of a carriage holder suitable for use in practicing the teachings of this invention.
Figure 6:
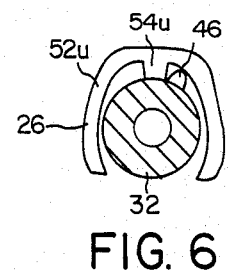
FIG. 6 is a top view, partially cut away, of the carriage holder of FIG. 5 having the pen of FIG. 2 mounted therein.

Referring to FIGS. 3 and 4, it is seen that stocker holder 18 has a generally U-shaped configuration with a pair of stopper element 50 projecting from roughly the center of the connecting leg. Holder 18 could be formed of plastic, metal, or other material having some resiliency so that groove 34 of pen casing 30 may be wedged between the side arms of holder 18 and into abutment with stop 50 and will be held in the holder by friction and by a slight spring pressure exerted by the side arms of holder 18 against the walls of groove 34. In accordance with the teachings of this invention projection 48 in groove 34 fits between one of the stoppers 50 and one of the side arms of holder 18 to maintain the annular orientation of the pen in holder 18 and to establish the proper orientation when the pen is inserted in the holder. While for the preferred embodiment shown in FIG. 4, the projection 48 fits between the right hand stopper 50 and the right leg of holder 18, the projection could be oriented in groove 32 so as to fit between the left stopper and left arm if desired.

Similarly, for the preferred embodiment, carriage holder 26 consists of a pair of U-shaped elements 52u and 52l, each having a stopper 54 projecting from the center of its connecting arm. Elements 52 are connected by a pair of legs 56. Grooves 32 and 36 fit respectively in U-shaped elements 52u and 52l and are held in the holders by friction and a slight spring pressure. The annular orientation of the pen in holder 26 is established and maintained by projection 46 fitting between stopper 54u and the right side arm of U-shaped element 52u. While for the preferred embodiment a projection 46 is shown only in groove 32 to interact with U-shaped element 52u, a corresponding projection could be formed or fitted in groove 36 to interact with lower U-shaped member 52l, either in addition to the projection 46 shown or instead thereof.

It is also noted that the projections 46 and 48 do not fit snugly in the spaces provided therefore so that some slight rotary movement of the pen in the holder is possible. This slight rotary movement does not interfere with the performance of the device since variations in annular orientation of the pen over a few degrees does not make any difference and greatly reduces the tolerances on the system required when transferring pens between the carriage and stocker holders. While the particular orientation of pen 16 in carriage holder 26 is not absolutely critical so long as the orientation is known and constant, the preferred orientation of the pen is such that reservoir 44 is facing toward the bottom of table 12.

While for the preferred embodiment of the invention described above, projections have been provided on the casing 30 of pen 16 to control the orientation of the pen in the holders, it is apparent that other equivalent means could be provided to assure proper orientation of the pen in the holders For example, a depression could be formed in the appropriate grooves in which the stoppers 50 and 54 would fit to maintain pen orientation or the grooves 32 and 34 could extend only partly around each side of casing 30 rather than being fully annular so that the pen would fit into holders 18 and 26 in only a single annular orientation. Similarly, while the plotter shown in FIG. 1 is an x-y plotter, the invention could be practiced with any plotter which has a transfer of a pen between a stocker holder and a carriage holder. For example, the invention could be used with a pen plotter of the type where movement in one direction is accomplished by moving a carriage, movement in the other direction is effected by moving the paper or other medium with rollers or similar devices and the stocker is a carousel which may be rotated to bring a desired pen into proximity with the carriage holder. Finally, while the invention has been described with reference to a calligraphy-style fountain pen, it could be utilized with other pens the writing quality of which is annular orientation dependent. Therefore, while the invention has been described above with reference to a preferred embodiment thereof, it will be apparent that the foregoing and other changes in form and detail may be made therein by one skilled in the art without departing from the spirit and scope of the invention.

What is claimed is:

1. A calligraphic writing system including:
    a plotter of the type having a pen carriage, a pen holder mouted on the carriage, a recording table, and means for moving the pen carriage relative to the table so that a pen mounted on said pen holder draws images on a sheet of paper or other medium mounted on said table, and,
    a pen having an asymmetric point removably mounted in said pen holder,
    said pen and said pen holder including positioning means arranged such that when said pen is removably mounted in said pen holder, said positioning means permits said pen to be mounted in said pen holder only in a predetermined and fixed annular position relative to said pen holder and maintains said pen in said annular position relative to said pen holder when said pen draws said images.

2. A calligraphic writing system comprising:
    a plotter of the type having a pen carriage, a pen holder mounted on the carriage, a recording table, and means for moving the pen carriage relative to the table so that a pen mounted on said pen holder draws images on a sheet of paper or other medium mounted on said table, and,
    a calligraphy-style fountain pen having a casing and an asymmetric point, said pen being removably mounted in said pen holder,
    one of said casing and said pen holder including a radial projection, and the other of said casing and said pen holder including means for interacting with said projection such that, when said pen is removably mounted in said pen holder, said positioning means permits said pen to be mounted in said pen holder only in a predetermined and fixed annular position relative to said pen holder and maintains the pen in a single annular orientation relative to the holder and carriage when said pen draws said images.

3. The system of claim 2 wherein said pen holder includes a U-shaped element with a stop projecting from the center of connecting leg, the holder being adapted to receive the pen wedged therein between the side arms of the elements and abutting the stop, and wherein the pen casing includes a projection adapted to fit between the stop and a side arm of the U-shaped element when the pen is mounted in the holder.

4. The system of claim 2 wherein said radial projection is on the casing of said pen holder.

* * * * *